(12) United States Patent
Wong et al.

(10) Patent No.: US 8,533,834 B1
(45) Date of Patent: Sep. 10, 2013

(54) ANTIVIRUS INTELLIGENT FLOW FRAMEWORK

(75) Inventors: Peter Wong, San Francisco, CA (US); De Xiong Li, Sunnyvale, CA (US); Chunqing Cheng, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 168 days.

(21) Appl. No.: 13/092,388

(22) Filed: Apr. 22, 2011

(51) Int. Cl.
*H04L 29/06* (2006.01)

(52) U.S. Cl.
USPC ............... 726/24; 726/22; 726/23; 726/25; 713/187; 713/188; 709/217; 709/219; 709/224; 709/225; 709/226; 709/229

(58) Field of Classification Search
USPC ...... 726/22–25; 713/187–188; 709/217–229
See application file for complete search history.

(56) References Cited

U.S. PATENT DOCUMENTS

| | | | | |
|---|---|---|---|---|
| 6,088,803 | A * | 7/2000 | Tso et al. | 726/22 |
| 7,392,544 | B1 * | 6/2008 | Pavlyushchik | 726/24 |
| 7,640,586 | B1 * | 12/2009 | Johnson et al. | 726/24 |
| 7,757,283 | B2 * | 7/2010 | Robert et al. | 726/22 |
| 8,087,084 | B1 * | 12/2011 | Andruss et al. | 726/24 |
| 2008/0301796 | A1 * | 12/2008 | Holostov et al. | 726/12 |
| 2008/0307524 | A1 * | 12/2008 | Singh et al. | 726/22 |
| 2012/0110667 | A1 * | 5/2012 | Zubrilin et al. | 726/24 |

OTHER PUBLICATIONS

Avfs: An On-Access Anti-Virus File System by Miretskiy et al; Publisher: USENIX; Year: 2004.*

"JSON in JavaScript"; retrieved online http://www.json.org/js.html, Mar. 7, 2011, 2 pages.
"Objects, Images, and Applets in HTML documents"; retrieved online http://www.w3.org/TR/REC-html40/struct/objects.html, Mar. 7, 2011, 20 pages.
"Frames in HTML documents"; retrieved online http://www.w3.org/TR/REC-html40/present/frames.html, Mar. 7, 2011, 12 pages.
"The XMLHttpRequest Object"; retrieved online http://www.w3schools.com/dom/dom_http.asp, Mar. 7, 2011, 3 pages.
"JavaScript and HTML DOM Reference" retrieved online http://www.w3schools.com/jsref/default.asp, Mar. 7, 2011, 2 pages.
"Mastering Ajax, Part 2: Make asynchronous requests with JavaScript and Ajax"; retrieved online http://www.ibm.com/developerworks/web/library/wa-ajaxintro2/, Mar. 7, 2011, 14 pages.
"Chapter 22. Asynchronous HTTP Request Processing"; retrieved online: http://docs.jboss.org/resteasy/docs/1.0.1.GA/userguide/html/Asynchronous_HTTP_Request_Processing.html, Mar. 17, 2011, 4 pages.
"Asynchronous JavaScript Technology and XML (Ajax) With the Java Platform" by Greg Murray; retrieved online http://www.oracle.com/technetwork/articles/javaee/ajax-135201.html, Mar. 7, 2011, 6 pages.

* cited by examiner

*Primary Examiner* — Madhuri Herzog
(74) *Attorney, Agent, or Firm* — Harrity & Harrity, LLP

(57) ABSTRACT

A device receives a data transaction associated with packet, determines a risk level associated with the data transaction, and performs a content type check for the data transaction. The device also performs an infected content check for the data transaction, and classifies, based on the determined risk and the performed checks, the data transaction for one of a slow path virus scanning process or a fast path virus scanning process. The device further performs, based on the classification, one of the slow path virus scanning process or the fast path virus scanning process on the data transaction.

21 Claims, 8 Drawing Sheets

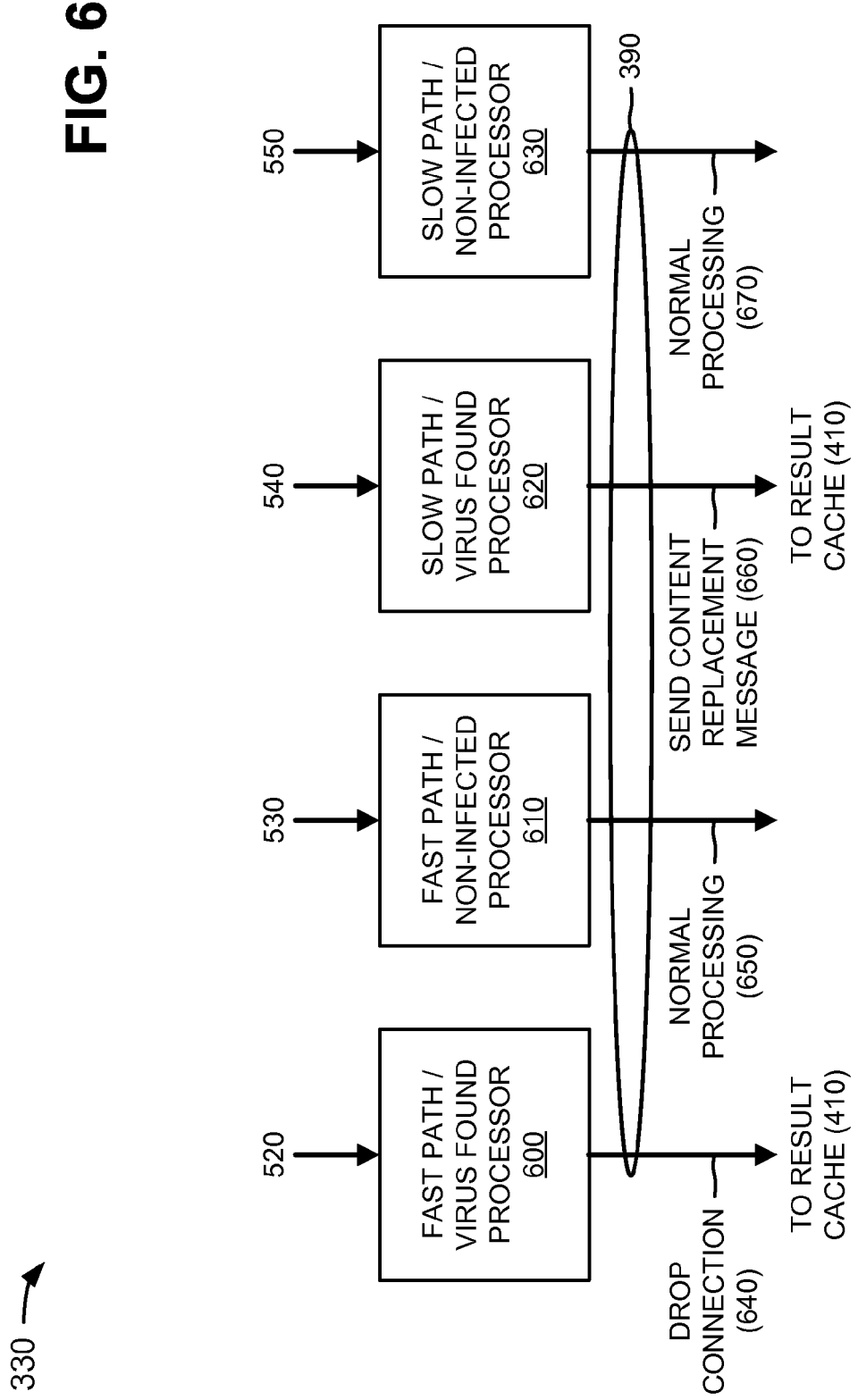

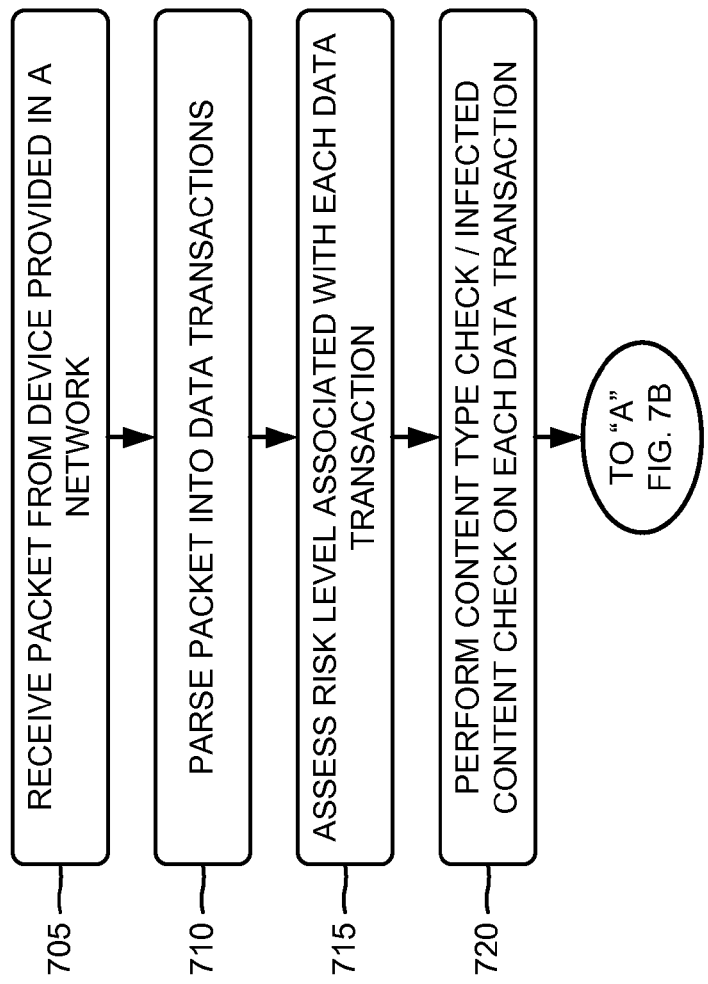

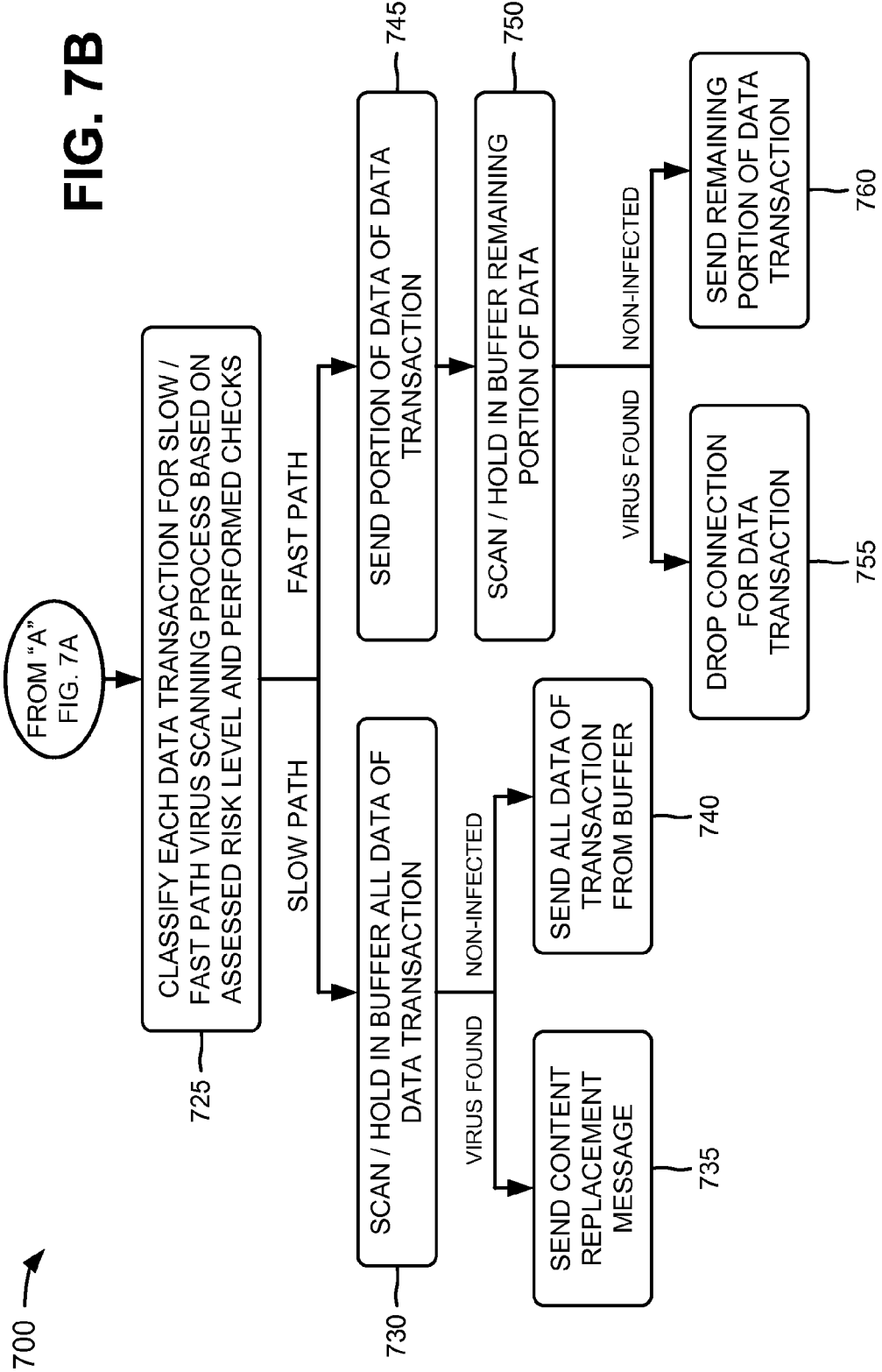

ANTIVIRUS INTELLIGENT FLOW FRAMEWORK

BACKGROUND

Computing and communication networks typically include network devices, such as routers, firewalls, switches, or gateways, which transfer or switch data, such as packets, from one or more sources to one or more destinations. Network devices may operate on the packets as the packets traverse the network, such as by forwarding or filtering the packet-based network traffic.

A network device may be particularly vulnerable to harmful traffic (e.g., incorrect protocols, signaling, etc.), nefarious information (e.g., viruses, worms, spy ware, malware, etc.), and/or electronic attack (e.g., spoofing, denial of service attacks, etc.) being transmitted via the network device. Network devices implement antivirus software to combat against such harmful traffic, nefarious information, and/or electronic attack.

Some antivirus software in network devices put heavy demands on internal buffer resources of the network devices. For example, some antivirus scanning methods, such as a store-and-forward method, buffer all data provided in a data transaction (e.g., data content of a packet) until a virus scanning of the data transaction is complete. The store-and-forward method will forward the data transaction on to a destination (or endpoint) when a virus is not detected. If the virus scanning detects a virus in the data transaction (i.e., the data transaction is infected), the store-and-forward method may ensure that none of the infected content reaches a destination since all data associated with the data transaction is buffered. The store-and-forward method is a highly secure mechanism for blocking traffic with known viruses. However, the store-and-forward method requires large amounts of information to be stored in a limited amount of data buffer memory provided in a network device. The store-and-forward method may cause the data buffer memory to reach its capacity, which may create congestion in the network device and may cause the network device to drop connections utilizing the antivirus scanning and/or connections handling non-antivirus traffic.

Another antivirus scanning method, a simple inline method, buffers a portion of a data transaction (e.g., provided in a packet) until virus scanning of the portion of the data transaction is complete. The simple inline method will forward the portion of the data transaction on to a destination when a virus is not detected. If the virus scanning detects a virus in the portion of the data transaction (i.e., the portion of the data transaction is infected), the simple inline method will drop a connection, associated with the portion of the data transaction, in order to prevent the data transaction from reaching a destination.

However, the simple inline method is less effective than the store-and-forward method in preventing know viruses from reaching a destination. The simple inline method may also increase the risk of data rendering. For example, if a web browser executes a download of script file, the simple inline method may not prevent an infected portion of the downloaded script file from causing harm to a destination. The simple inline method may not prevent a destination from receiving and using a partial file that is infected since a partial file (e.g., an executable file, such as script file) may still be executed on the destination. Furthermore, the simple inline method may enable a protocol layer caching scheme to permit a partial virus signature to be received by a destination during a retry of a download.

SUMMARY

According to one aspect, a method, performed by a network device, may include: receiving, by the network device, a packet from a device provided in a network; parsing, by the network device, the packet into a plurality of data transactions; assessing, by the network device, a risk level associated with a particular data transaction of the plurality of data transactions; performing, by the network device, a content type check for the particular data transaction; performing, by the network device, an infected content check for the particular data transaction; classifying, by the network device and based on the assessed risk and the performed checks, the particular data transaction for one of a slow path virus scanning process or a fast path virus scanning process; and performing, by the network device and based on the classifying, one of the slow path virus scanning process or the fast path virus scanning process on the particular data transaction.

According to another aspect, a network device may include a memory to store a virus database, and a processor to: receive a data transaction associated with packet, determine a risk level associated with the data transaction, perform a content type check for the data transaction, perform an infected content check for the data transaction, classify, based on the determined risk and the performed checks, the data transaction for one of a slow path virus scanning process or a fast path virus scanning process, and perform, based on the classifying and via the virus database, one of the slow path virus scanning process or the fast path virus scanning process on the data transaction.

According to still another aspect, one or more non-transitory computer-readable media may store instructions executable by one or more processors of a network device. The media may include: one or more instructions to receive a packet that includes a plurality data transactions; one or more instructions to assess a risk level associated with a particular data transaction of the plurality of data transactions; one or more instructions to perform a content type check for the particular data transaction; one or more instructions to perform an infected content check for the particular data transaction; one or more instructions to classify, based on the assessed risk and the performed checks, the particular data transaction for one of a slow path virus scanning process or a fast path virus scanning process; and one or more instructions to perform, based on the classification, one of the slow path virus scanning process or the fast path virus scanning process on the particular data transaction.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 is a diagram of example functional components of a result processor of the antivirus intelligent flow module depicted in FIG. 3; and FIGS. 7A and 7B depict a flow chart of an example process for providing an antivirus intelligent flow framework according to an implementation described herein.

DETAILED DESCRIPTION

Figure 1:
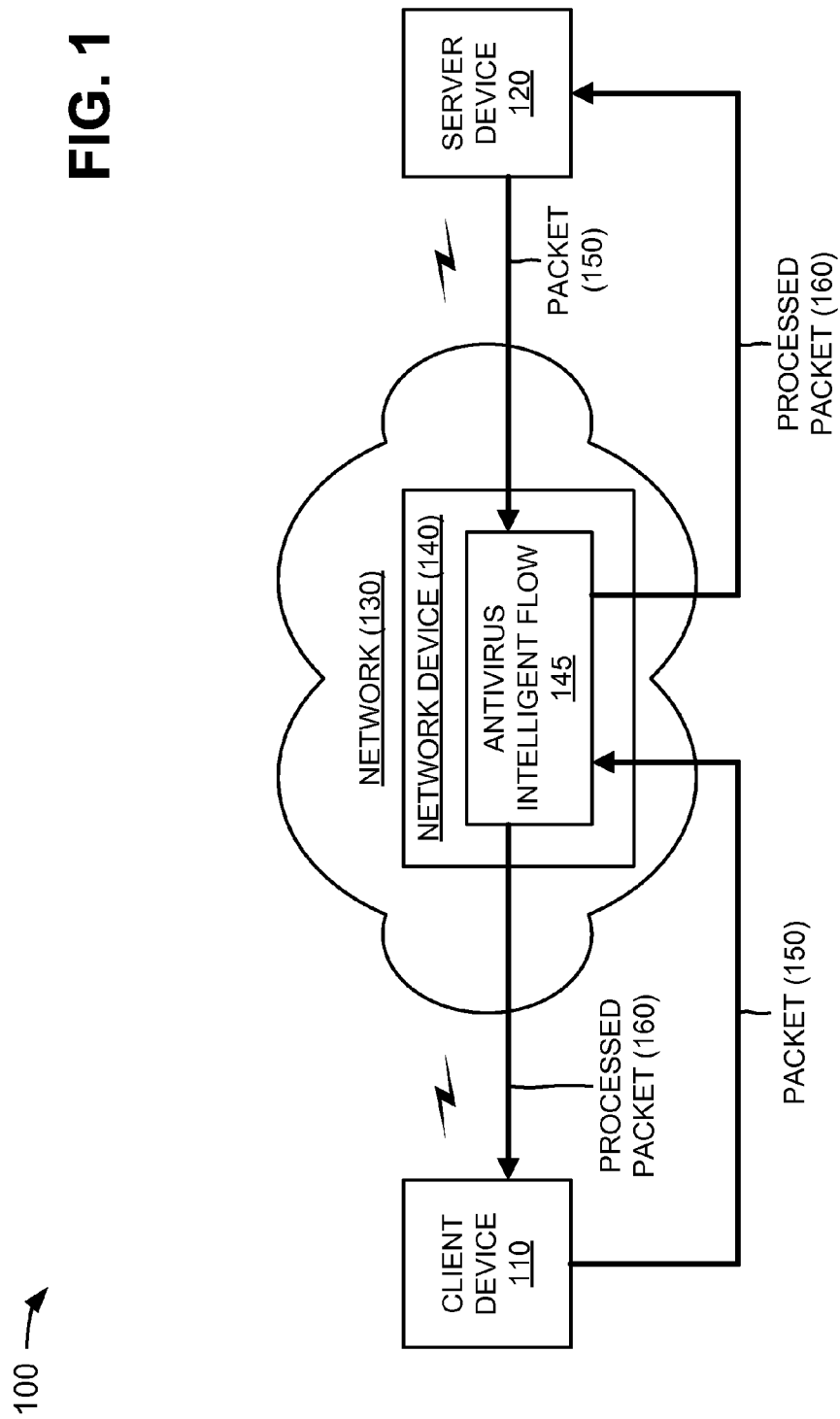
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may provide an antivirus intelligent flow framework for a network device, such as a router, a firewall, a switch, a gateway, etc. The antivirus intelligent flow framework may receive a packet, may parse the packet into data transactions, and may assess a virus risk level for each data transaction. The antivirus intelligent flow framework may classify each data transaction for a slow path virus scanning process or for a fast path virus scanning process based on the virus risk level assessed for the data transaction. For example, a data transaction may be classified for the slow path virus scanning process when a risk that the data transaction contains a virus is greater than a risk level threshold (e.g., a high virus risk level) or less than a confidence threshold (e.g., a low degree of confidence that the data transaction is safe). A data transaction may be classified for the fast path virus scanning process when a risk that the data transaction contains a virus is less than the risk level threshold (e.g., a low virus risk level) or greater than the confidence threshold (e.g., a high degree of confidence that the data transaction is safe).

The antivirus intelligent flow framework may process each data transaction based on the classification of the data transaction. For example, the slow path virus scanning process may include storing all data of a data transaction, in a buffer of the network device, and scanning all data of the data transaction prior to forwarding any data from the buffer. If a virus is detected in any data of the data transaction by the slow path virus scanning process, the antivirus intelligent flow framework may generate a content replacement message. If a virus is not detected in any data of the data transaction by the slow path virus scanning process, the antivirus intelligent flow framework may send all data of the data transaction to a destination (or endpoint).

The fast path virus scanning process may include sending a portion of the data of the data transaction to a destination, storing a remaining portion of the data of the data transaction in the buffer of the network device, and scanning the remaining portion of the data. If a virus is detected in the remaining portion of the data by the fast path virus scanning process, the antivirus intelligent flow framework may drop a connection for the data transaction. If a virus is not detected in the remaining portion of the data by the fast path virus scanning process, the antivirus intelligent flow framework may send the remaining portion of the data of the data transaction to a destination.

The systems and/or methods described herein may manage the risks not addressed by the simple inline method, such as providing a high degree of confidence for blocking a known virus, preventing a thread with a virus from reaching a destination, etc. The systems and/or methods may also provide a way to perform content replacement (e.g., with a drop message) of content containing a virus. The systems and/or method may reduce data buffering demands on a network device utilizing antivirus filtering, which may reduce internal congestion in the network device. Furthermore, the systems and/or methods may reduce latency for data transactions, and may increase the amount of data transactions (content) that may be scanned for viruses by the network device.

FIG. 1 is a diagram of an example network 100 in which systems and/or methods described herein may be implemented. As illustrated, network 100 may include a client device 110; a server device 120; a network 130; and a network device 140 provided in or attached to network 130. Network device 140 may include an antivirus intelligent flow module 145. Devices of network 100 may interconnect via wired and/or wireless connections or links. A single client device 110, server device 120, network 130, network device 140, and antivirus intelligent flow module 145 have been illustrated in FIG. 1 for simplicity. In practice, there may be more client devices 110, server devices 120, networks 130, network devices 140, and/or antivirus intelligent flow modules 145. Also, in some instances, one or more of the devices of network 100 may perform one or more tasks described as being performed by another one or more of the devices of network 100.

Client device 110 may include any device that is capable of accessing server device 120 via network 130 and/or network device 140. For example, client device 110 may include a radiotelephone, a personal communications system (PCS) terminal that may combine a cellular radiotelephone with data processing and data communications capabilities, a personal digital assistant (PDA) that can include a radiotelephone, a pager, Internet/intranet access, etc., a wireless device (e.g., a wireless telephone), a smart phone, a workstation computer, a laptop computer, a personal computer, or other types of computation or communication devices.

Server device 120 may include one or more server devices, or other types of computation or communication devices, that gather, process, search, and/or provide information in a manner described herein. In one example implementation, server device 120 may include resources, such as services or content, that may be accessed by client device 110 via network 130 and/or network device 140. In one example, server device 120 may include a device, owned and/or operated by a service provider, that provides services (e.g., telecommunications services, email services, etc.) or content (e.g., audio content, video content, etc.) to client device 110.

Network 130 may include one or more networks of any type. For example, network 130 may include a local area network (LAN); a wide area network (WAN); a metropolitan area network (MAN); a telephone network (e.g., the Public Switched Telephone Network (PSTN) or a cellular network); the Internet; an intranet; or a combination of networks.

Network device 140 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic (e.g., packets). In one example, network device 140 may enable client device 110 and server device 120 to communicate with one another. In another example, network device 140 may enable client device 110 to request and receive resources from server device 120.

Antivirus intelligent flow module 145 may include hardware or a combination of hardware and software that enables network device 140 to perform operations described herein. In one example implementation, antivirus intelligent flow module 145 may receive a packet 150 from a device (e.g., client device 110 or server device 120), may parse packet 150 into data transactions, and may assess a virus risk level for each data transaction. The term data transaction, as used herein, is intended to be broadly construed to include a portion of a frame, a datagram, a packet, or a cell that includes a set of data to perform a particular function. A data transaction may include content, such as audio content, video content, and/or textual content.

Antivirus intelligent flow module 145 may classify each data transaction for a slow path virus scanning process or for a fast path virus scanning process based on the virus risk level assessed for the data transaction. For example, a data transaction may be classified for the slow path virus scanning process when a risk that the data transaction contains a virus is greater than a risk level threshold (e.g., a high virus risk level) or less than a confidence threshold (e.g., a low degree of confidence that the data transaction is safe). A data transaction may be classified for the fast path virus scanning process when a risk that the data transaction contains a virus is less than the risk level threshold (e.g., a low virus risk level) or greater than the confidence threshold (e.g., a high degree of confidence that the data transaction is safe).

Antivirus intelligent flow module 145 may process each data transaction based on the classification of the data transaction. For example, antivirus intelligent flow module 145 may utilize the slow path virus scanning process to store all data of a data transaction, in a buffer of network device 140, and to scan all data of the data transaction prior to forwarding any data from the buffer. If a virus is detected in any data of the data transaction by the slow path virus scanning process, antivirus intelligent flow module 145 may generate a content replacement message and may send the content replacement message as a processed packet 160. If a virus is not detected in any data of the data transaction by the slow path virus scanning process, antivirus intelligent flow module 145 may send all data of the data transaction to a destination (e.g., to client device 110 or server device 120 via processed packet 160).

Antivirus intelligent flow module 145 may utilize the fast path virus scanning process to send a portion of the data of the data transaction to a destination (e.g., to client device 110 or server device 120 via processed packet 160); to store a remaining portion of the data of the data transaction in the buffer of network device 140; and to scan the remaining portion of the data. If a virus is detected in the remaining portion of the data by the fast path virus scanning process, antivirus intelligent flow module 145 may drop a connection for the data transaction. If a virus is not detected in the remaining portion of the data by the fast path virus scanning process, antivirus intelligent flow module 145 may send the remaining portion of the data of the data transaction to a destination (e.g., to client device 110 or server device 120 via processed packet 160).

Although FIG. 1 shows example devices/networks of network 100, in other implementations, network 100 may include fewer devices/networks, different devices/networks, differently arranged devices/networks, or additional devices/networks than depicted in FIG. 1.

Figure 2:
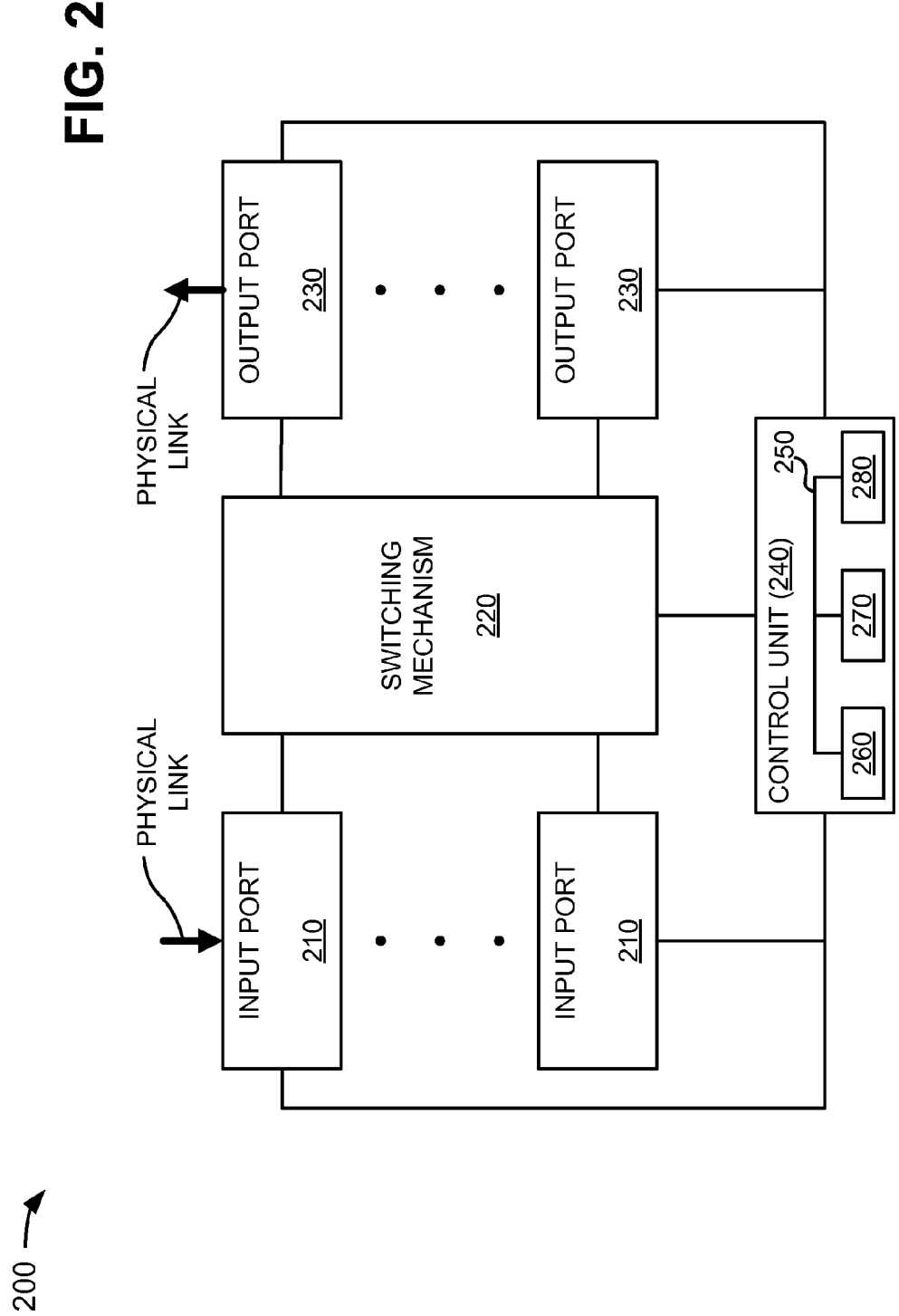
FIG. 2 is a diagram of example components of a network device depicted in FIG. 1.

FIG. 2 is a diagram of example components of a device 200 that may correspond to network device 140 (FIG. 1). In some instances, network device 140 may include one or more devices 200. As shown in FIG. 2, device 200 may include input ports 210, a switching mechanism 220, output ports 230, and a control unit 240.

Input ports 210 may be a point of attachment for physical links and may be a point of entry for incoming traffic, such as packets. Input ports 210 may carry out data link layer encapsulation and decapsulation. In an example implementation, input ports 210 may send and/or receive packets.

Switching mechanism 220 may interconnect input ports 210 with output ports 230. Switching mechanism 220 may be implemented using many different techniques. For example, switching mechanism 220 may be implemented via busses, crossbars, and/or with shared memories which may act as temporary buffers to store traffic from input ports 210 before the traffic is eventually scheduled for delivery to output ports 230.

Output ports 230 may store packets and may schedule packets for service on output physical links. Output ports 230 may include scheduling algorithms that support priorities and guarantees. Output ports 230 may support data link layer encapsulation and decapsulation, and/or a variety of higher-level protocols. In an example implementation, output ports 230 may send packets and/or receive packets.

Control unit 240 may use routing protocols and one or more forwarding tables for forwarding packets. Control unit 240 may connect with input ports 210, switching mechanism 220, and output ports 230. Control unit 240 may compute a forwarding table, implement routing protocols, and/or run software to configure and manage device 200. Control unit 240 may handle any packet whose destination address may not be found in the forwarding table.

In an example implementation, control unit 240 may include a bus 250 that may include a path that permits communication among a processor 260, a memory 270, and a communication interface 280. Processor 260 may one or more processors, microprocessors, application-specific integrated circuit (ASICs), field-programmable gate arrays (FPGAs), or other types of processing units that interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Memory 270 may also temporarily store incoming traffic (e.g., a header of a packet or an entire packet) from input ports 210, for processing by processor 260, before a packet is directed back to switching mechanism 220, queued in switching mechanism 220, and eventually scheduled to be sent to output ports 230. Communication interface 280 may include any transceiver-like mechanism that enables control unit 240 to communicate with other devices and/or systems.

Device 200 may perform certain operations, as described herein. Device 200 may perform these operations in response to processor 260 executing software instructions contained in a computer-readable medium, such as memory 270. A computer-readable medium may be defined as a non-transitory memory device. A memory device may include space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
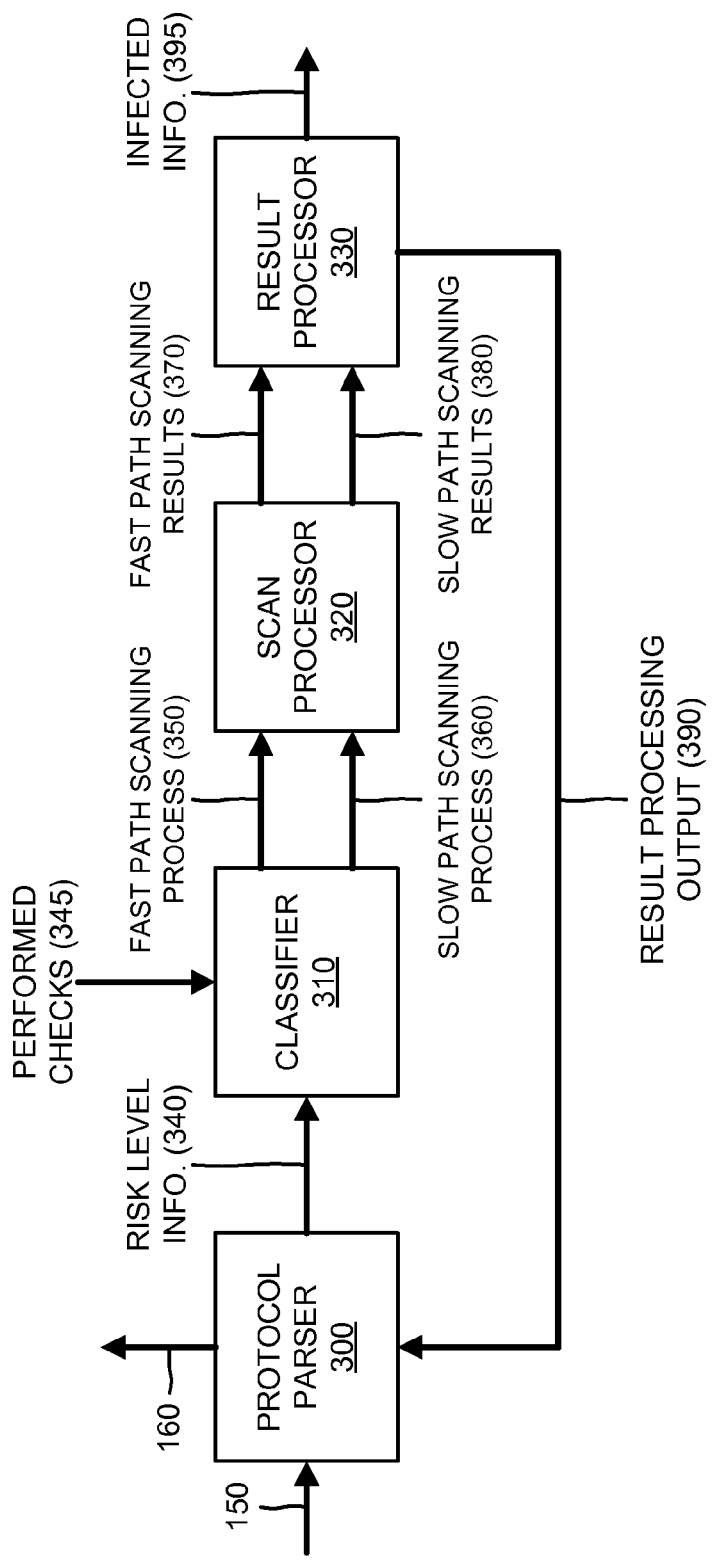
FIG. 3 is a diagram of example functional components of an antivirus intelligent flow module of the network device illustrated in FIG. 1.

FIG. 3 is a diagram of example functional components of antivirus intelligent flow module 145. As shown, antivirus intelligent flow module 145 may include a protocol parser 300, a classifier 310, a scan processor 320, and a result processor 330. In one example implementation, one or more of the functional components described in connection with FIG. 3 may be implemented by one or more of the example components of device 200 (FIG. 2).

Protocol parser 300 may provide an exit and entry point for packets, data transactions, sessions, session information (e.g., a start of a new transaction or a transaction identifier), etc. provided to or transmitted from antivirus intelligent flow module 145. Protocol parser 300 may include a different mechanism for handling different types of traffic, such as a hypertext transfer protocol (HTTP) mechanism for handling HTTP traffic, a file transfer protocol (FTP) mechanism for handling FTP traffic, etc.

Protocol parser 300 may receive packet 150 from client device 110 or server device 120, and may parse packet 150 into data transactions. Protocol parser 300 may assess a risk level associated with each data transaction of packet 150. For example, protocol parser 300 may apply a risk rating (e.g., low/no risk or high risk) to each data transaction of packet 150 based on knowledge of protocol layer information associated with each data transaction. A detected risk may mean that certain characteristics found in a data transaction may be risky to use for the fast path virus scanning process. For example, if a connection were dropped when a virus is detected, a remaining portion of a data transaction may be blocked from a destination (e.g., client device 110 or server device 120) and the destination may not be able to determine that a data transaction is incomplete. In one example implementation, protocol parser 300 may provide some data of a data transaction to classifier 310, and classifier 310 may use the data to perform a result cache lookup operation for the data transaction, as described below. As further shown in FIG. 3, protocol parser 300 may provide risk level information 340, which includes the assessed risk levels (e.g., "low" or "high") for the data transactions of packet 150, to classifier 310.

Classifier 310 may receive risk level information 340 for each data transaction of packet 150, and may perform checks on each data transaction, as indicated by reference number 345. For example, classifier 310 may check a content type associated with each data transaction, and may perform a result cache lookup to check if each data transaction resembles previously found infected content. Classifier 310 may classify each data transaction for either a slow path virus scanning process or a fast path virus scanning process based on risk level information 340 and/or performed checks 345. As further shown in FIG. 3, classifier 310 may provide, to scan processor 320 and for each data transaction, either an indicator 350 instructing scan processor 320 to perform the fast path virus scanning process or an indicator 360 instructing scan processor 320 to perform the slow path virus scanning process.

Scan processor 320 may receive indicator 350 or indicator 360 from classifier 310, and may perform a virus scanning process based on which indicator is received. For example, if scan processor 320 receives indicator 350 for a particular data transaction, scan processor 320 may perform the fast path virus scanning process for the data transaction. The fast path virus scanning process may include sending a portion of the data of the data transaction to a destination (e.g., client device 110 or server device 120), storing a remaining portion of the data of the data transaction in a buffer (e.g., memory 270) of network device 140, and scanning the remaining portion of the data. If scan processor 320 performs the fast path virus scanning process, scan processor 320 may provide results 370 of the fast path virus scanning process to result processor 330. Results 370 may indicate that the data of the data transaction provided in the buffer is infected with a virus, or may indicate that the data of the data transaction provided in the buffer is not infected with a virus.

If scan processor 320 receives indicator 360 for a particular data transaction, scan processor 320 may perform the slow path virus scanning process for the data transaction. The slow path virus scanning process may include storing all data of the data transaction, in a buffer (e.g., memory 270) of network device 140, and scanning all data of the data transaction prior to forwarding any data from the buffer. If scan processor 320 performs the slow path virus scanning process, scan processor 320 may provide results 380 of the slow path virus scanning process to result processor 330. Results 380 may indicate that any data of the data transaction is infected with a virus, or may indicate that all data of the data transaction is not infected with a virus.

Result processor 320 may receive results 370 or results 380 from scan processor 320, and may generate a result processing output 390 based on which results are received. For example, if result processor 330 receives results 370, and results 370 indicate that the data of the data transaction provided in the buffer is infected with a virus, result processor 330 may generate result processing output 390 instructing network device 140 to drop a connection for the data transaction. If results 370 indicate that the data of the data transaction provided in the buffer is not infected with a virus, result processor 330 may generate result processing output 390 instructing network device 140 to send the remaining portion of the data of the data transaction to a destination, such as client device 110 or server device 120.

If result processor 330 receives results 380, and results 380 indicate that any data of the data transaction is infected with a virus, result processor 330 may generate result processing output 390 instructing network device 140 to generate a content replacement message for the data transaction. If results 380 indicate that all data of the data transaction is not infected with a virus, result processor 330 may generate result processing output 390 instructing network device 140 to send all data of the data transaction to a destination. When results 370/380 indicate a data transaction with infected content, result processor 330 may provide information 395 associated with the infected content to a result cache, provided in network device 140 (e.g., in memory 270), for storage.

As further shown in FIG. 3, result processor 330 may provide the determined result processing output 390 to protocol parser 300. Protocol parser 300 may receive result processing output 390, and may provide an interface for antivirus intelligent flow module 145 to effectuate, on a data transaction and via processed packet 160, the instructions provided by result processing output 390. For example, protocol parser 300 may drop a connection for the data transaction, based on result processing output 390, which may interrupt a flow of data and cause a connection to terminate on endpoints, such as client device 110 or server device 120. In another example, protocol parser 300 may transmit processed packet 160 to an endpoint based on result processing output 390.

Although FIG. 3 shows example functional components of antivirus intelligent flow module 145, in other implementations, antivirus intelligent flow module 145 may include fewer functional components, different functional components, differently arranged functional components, or additional functional components than depicted in FIG. 3. Alternatively, or additionally, one or more functional components of antivirus intelligent flow module 145 may perform one or more other tasks described as being performed by one or more other functional components of antivirus intelligent flow module 145.

Figure 4:
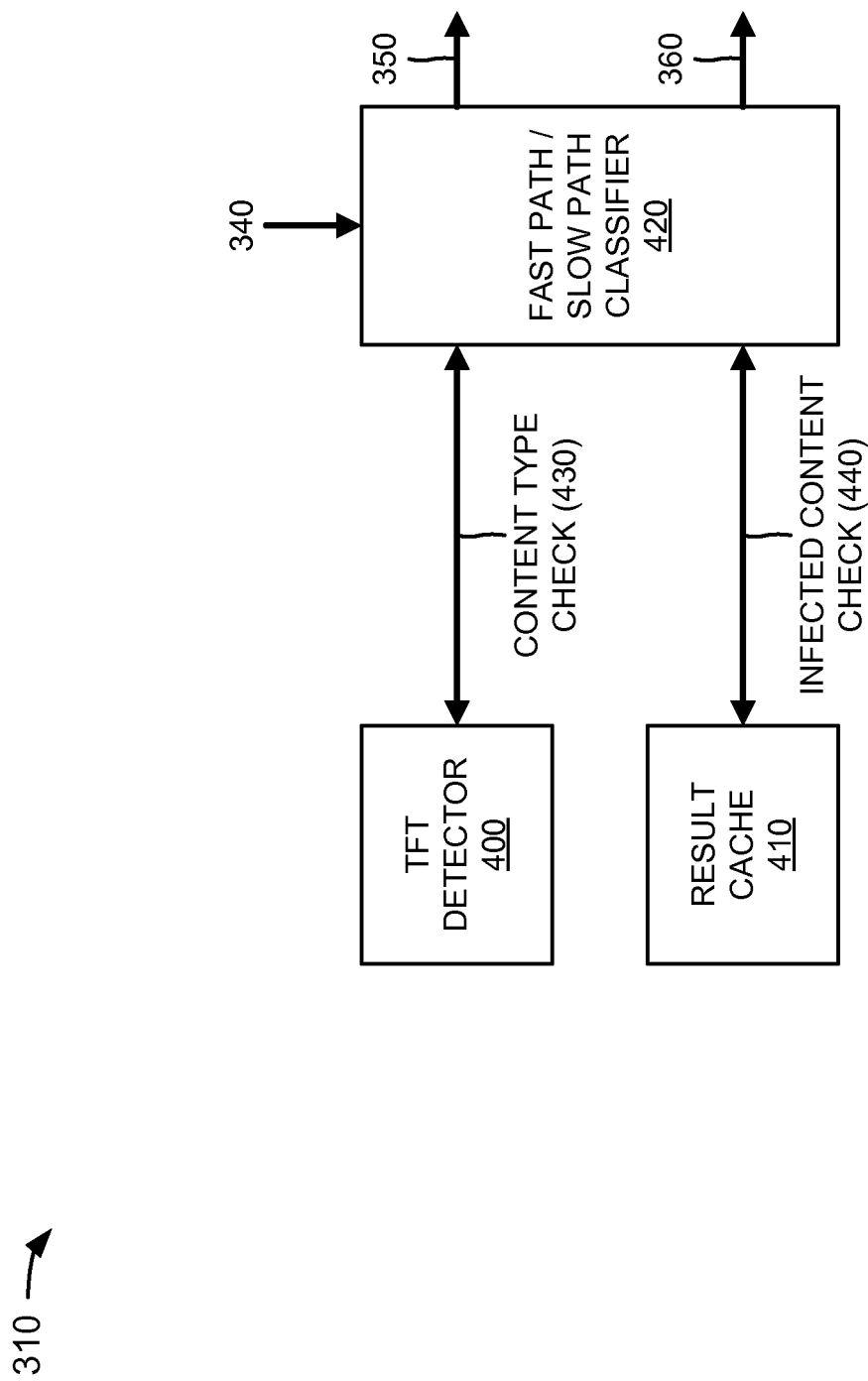
FIG. 4 is a diagram of example functional components of a classifier of the antivirus intelligent flow module depicted in FIG. 3.

FIG. 4 is a diagram of example functional components of classifier 310. As shown, classifier 310 may include a true file type (TFT) detector 400, a result cache 410, and a fast path/slow path classifier 420. In one example implementation, one or more of the functional components, described in connection with FIG. 4, may be implemented by one or more of the example components of device 200 (FIG. 2).

TFT detector 400 may enable fast path/slow path classifier 420 to obtain a file type risk rating based on a true file type detection method and a content type check 430. The true file type detection method may accurately identify a file type associated with content (e.g., a data transaction), and may determine whether the identified file type matches a file type associated with a low risk category. A low risk category may refer to types of content that are not usable if an endpoint receives only a portion of the content. TFT detector 400 may assign a low file type risk rating (e.g., to a data transaction) when the identified file type matches a "low" risk category (e.g., a certain executable (.exe) file type, a certain type of zip file (gzip), or other types of files that are not usable if incomplete). TFT detector 400 may assign a "high" file type risk rating (e.g., to a data transaction) when the identified file type does not matches a low risk category (e.g., a file, such as script file or a Linux application, that can cause harm even if only a portion of the file is received by an endpoint).

Result cache 410 may include one or more storage devices (e.g., memory 270) that store information associated with previously detected viruses or infected content. Result cache 410 may generate a cache entry for each infected file, and each cache entry may include one or more hash values and portions of the actual infected file. Each cache entry may include a number of bytes of data content or multiple sections of data content. A certain portion, such as a beginning portion, of the infected file may be stored in result cache 410 to improve accuracy for a match.

Result cache 410 may enable fast path/slow path classifier 420 to obtain a possible infected content risk rating based on an infected content check 440. Fast path/slow path classifier 420, via infected content check 440, may check if a data transaction resembles previously found infected content contained result cache 410. In one example, infected content check 440 may include checking some data of a data transaction to see if the data resembles infected content provided in result cache 410. If the data does not match infected content provided in result cache 410, result cache 410 may assign a "low" possible infected content risk rating to the data transaction. If the data matches infected content provided in result cache 410, result cache 410 may assign a "high" possible infected content risk rating to the data transaction.

Fast path/slow patch classifier 420 may receive risk level information 340 from protocol parser 300, may receive the file type risk rating from TFT detector 400 (e.g., via content type check 430), and may receive the possible infected content risk rating from result cache 410 (e.g., via infected content check 440). Fast path/slow path classifier 420 may classify each data transaction for either a slow path virus scanning process or a fast path virus scanning process based on the received information. Based on the classification, fast path/slow patch classifier 420 may provide, to scan processor 320 and for each data transaction, either indicator 350 instructing scan processor 320 to perform the fast path virus scanning process or indicator 360 instructing scan processor 320 to perform the slow path virus scanning process. In one example implementation, fast path/slow patch classifier 420 may classify each data transaction according to the following table.

TABLE

| Risk Level Information | File Type Risk Rating | Possible Infected Content Risk Rating | Calculated Risk | Result (Fast Path or Slow Path) |
|---|---|---|---|---|
| Low | Low | Low | Low | Fast Path |
| High | — | — | High | Slow Path |
| — | High | — | High | Slow Path |
| — | — | High | High | Slow Path |

In other implementations, the table may include more elements, fewer elements, different elements, or differently arranged elements than depicted above.

Although FIG. 4 shows example functional components of classifier 310, in other implementations, classifier 310 may include fewer functional components, different functional components, differently arranged functional components, or additional functional components than depicted in FIG. 4. Alternatively, or additionally, one or more functional components of classifier 310 may perform one or more other tasks described as being performed by one or more other functional components of classifier 310.

Figure 5:
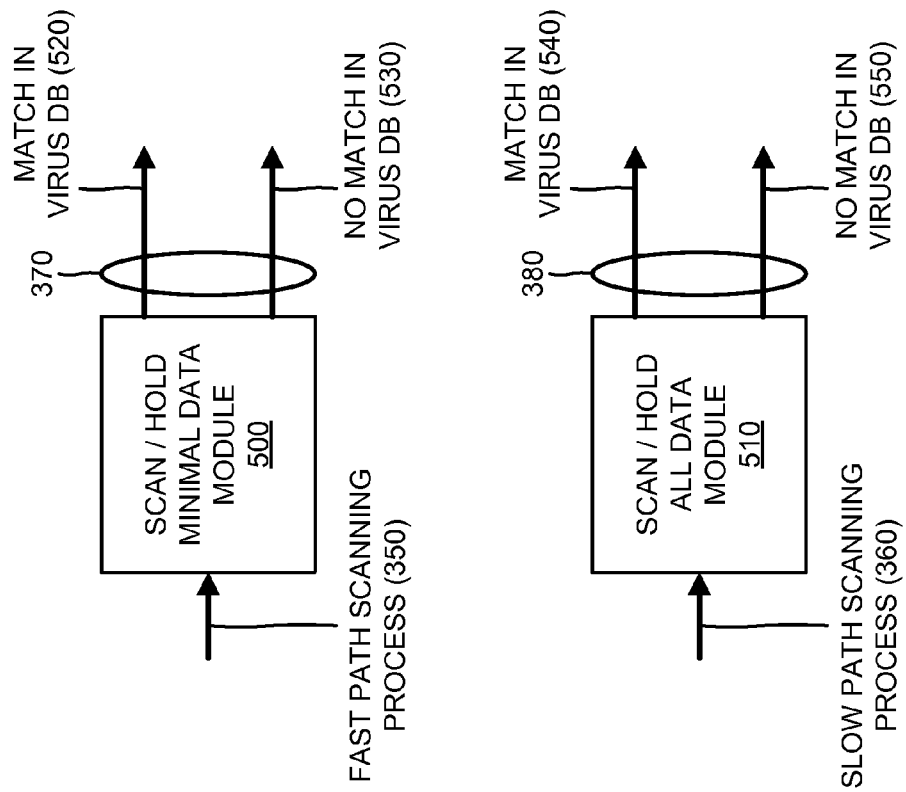
FIG. 5 is a diagram of example functional components of a scan processor of the antivirus intelligent flow module illustrated in FIG. 3.

FIG. 5 is a diagram of example functional components of scan processor 320. As shown, scan processor 320 may include a scan/hold minimal data module 500 and a scan/hold all data module 510. In one example implementation, one or more of the functional components, described in connection with FIG. 5, may be implemented by one or more of the example components of device 200 (FIG. 2).

If scan processor 320 receives indicator 350 for a particular data transaction, scan processor 320 may provide indicator 350 to scan/hold minimal data module 500. Based on indicator 350, scan/hold minimal data module 500 may perform the fast path virus scanning process for the data transaction. Thus, scan/hold minimal data module 500 may send a portion of the data of the data transaction to a destination (e.g., client device 110 or server device 120), may store a remaining portion of the data (e.g., a few kilobytes of data) of the data transaction in a buffer (e.g., memory 270) of network device 140, and may scan the remaining portion of the data. In one example, scan/hold minimal data module 500 may store the remaining portion data in the buffer for a short amount of time, such as until the remaining portion of the data is scanned for viruses. The stored portion of the data may be small to ensure proper flow processing. For example, the stored portion of the data may block all parts of a virus signature, which may cause an incomplete data transaction condition when the virus signature is near the end of content. This may cause an endpoint to restart a data transfer and partial content at a destination may be unusable or corrupted.

After scan/hold minimal data module 500 performs the fast path virus scanning process, scan/hold minimal data module 500 may provide results 370 of the fast path virus scanning process to result processor 330. Results 370 may indicate that the stored portion of the data is infected with a virus when the data matches a virus provided in a virus database (e.g., provided in result cache 410), as indicated by reference number 520. Alternatively, results 370 may indicate that the stored portion of the data is not infected with a virus when the data does not match a virus in the virus database, as indicated by reference number 530.

If scan processor 320 receives indicator 360 for a particular data transaction, scan processor 320 may provide indicator 360 to scan/hold all data module 510. Based on indicator 350, scan/hold all data module 510 may perform the slow path virus scanning process for the data transaction. Thus, scan/hold all data module 510 may store all data of the data transaction, in a buffer (e.g., memory 270) of network device 140, and may scan all data of the data transaction prior to forwarding any data from the buffer. After scan/hold all data module 510 performs the slow path virus scanning process, scan/hold all data module 510 may provide results 380 of the slow path virus scanning process to result processor 330. Results 380 may indicate that the data of the data transaction is infected with a virus when any of the data matches a virus provided in the virus database, as indicated by reference number 540. Alternatively, results 380 may indicate that all data of the data transaction is not infected with a virus when all of the data does not match a virus in the virus database, as indicated by reference number 550.

Although FIG. 5 shows example functional components of scan processor 320, in other implementations, scan processor 320 may include fewer functional components, different functional components, differently arranged functional components, or additional functional components than depicted in FIG. 5. Alternatively, or additionally, one or more functional components of scan processor 320 may perform one or more other tasks described as being performed by one or more other functional components of scan processor 320.

FIG. 6 is a diagram of example functional components of result processor 330. As shown, result processor 330 may include a fast path/virus found processor 600, a fast path/non-infected processor 610, a slow path/virus found processor 620, and slow path/non-infected processor 630. In one example implementation, one or more of the functional components, described in connection with FIG. 6, may be implemented by one or more of the example components of device 200 (FIG. 2).

Fast path/virus found processor 600 may receive, from scan processor 320, indication 520 that the portion of the data of the data transaction is infected with a virus. Based on indication 520, fast path/virus found processor 600 may instruct network device 140 to drop a connection for the data transaction, as indicated by reference number 640. Fast path/virus found processor 600 may also forward the infected data to result cache 410. By dropping the connection for the data transaction, network device 140 may interrupt the data transaction, which may cause an endpoint to retry the data transaction.

Fast path/non-infected processor 610 may receive, from scan processor 320, indication 530 that the portion of the data of the data transaction is not infected with a virus. Based on indication 530, fast path/non-infected processor 610 may instruct network device 140 to normally process 650 the data transaction, which may include sending the portion of the data to an endpoint and closing a connection for the data transaction.

Slow path/virus found processor 620 may receive, from scan processor 320, indication 540 that the data of the data transaction is infected with a virus. Based on indication 540, slow path/virus found processor 620 may instruct network device 140 to send a content replacement message for the data transaction, as indicated by reference number 660, and to close a connection for the data transaction. Slow path/virus found processor 620 may also forward the infected data to result cache 410.

Slow path/non-infected processor 630 may receive, from scan processor 320, indication 540 that all data of the data transaction is not infected with a virus. Based on indication 540, slow path/non-infected processor 630 may instruct network device 140 to normally process 670 the data transaction, which may include sending all data of the data transaction to an endpoint and closing a connection for the data transaction. As further shown in FIG. 6, reference numbers 640-670 may correspond to result processing output 390 (FIG. 3).

FIGS. 7A and 7B depict a flow chart of an example process 700 for providing an antivirus intelligent flow framework according to an implementation described herein. In one implementation, process 700 may be performed by network device 140. In another implementation, some or all of process 700 may be performed by one or more devices other than network device 140 or in combination with network device 140.

As illustrated in FIG. 7A, process 700 may include receiving a packet from a device provided in a network (block 705), and parsing the packet into data transactions (block 710). For example, in an implementation described above in connection with FIG. 3, protocol parser 300 of network device 140 may receive packet 150 from client device 110 or server device 120, and may parse packet 150 into data transactions.

As further shown in FIG. 7A, process 700 may include assessing a risk level associated with each data transaction (block 715), and performing a content type check and infected content check on each data transaction (block 720). For example, in an implementation described above in connection with FIG. 3, protocol parser 300 may assess a risk level associated with each data transaction of packet 150. In one example, protocol parser 300 may apply a risk rating (e.g., low/no risk or high risk) to each data transaction of packet 150 based on knowledge of protocol layer information associated with each data transaction. Classifier 310 of network device 140 may perform checks on each data transaction, as indicated by reference number 345. In one example, classifier 310 may check a content type associated with each data transaction, and may perform a result cache lookup to check if each data transaction resembles previously found infected content.

As shown in FIG. 7B, process 700 may include classifying each data transaction for a slow or fast path virus scanning process based on the assessed risk level and the performed checks (block 725). If the data transaction is classified for the slow path virus scanning process (block 725—SLOW PATH), process 700 may include scanning and holding in a buffer all data of the data transaction (block 730). If a virus is found during the scanning of all data of the data transaction (block 730—VIRUS FOUND), process 700 may include sending a content replacement message for the data transaction (block 735). If a virus is not found during the scanning of all data of the data transaction (block 730—NON-INFECTED), process 700 may include sending all data of the data transaction to a destination (block 740).

For example, in an implementation described above in connection with FIG. 3, classifier 310 may classify each data transaction for either a slow path virus scanning process or a fast path virus scanning process based on risk level information 340 and/or performed checks 345. Classifier 310 may provide, to scan processor 320 of network device 140 and for each data transaction, either indicator 350 instructing scan processor 320 to perform the fast path virus scanning process or indicator 360 instructing scan processor 320 to perform the slow path virus scanning process. If scan processor 320 receives indicator 360 for a particular data transaction, scan processor 320 may store all data of the data transaction, in a buffer (e.g., memory 270) of network device 140, and may scan all data of the data transaction prior to forwarding any data from the buffer. Scan processor 320 may provide results 380 of the slow path virus scanning process to result processor 330 of network device 140. If result processor 330 receives results 380, and results 380 indicate that any data of the data transaction is infected with a virus, result processor 330 may generate result processing output 390 instructing network device 140 to generate a content replacement message for the data transaction. If results 380 indicate that all data of the data transaction is not infected with a virus, result processor 330 may generate result processing output 390 instructing network device 140 to send all data of the data transaction to a destination.

As further shown in FIG. 7B, if the data transaction is classified for the fast path virus scanning process (block 725—FAST PATH), process 700 may include sending a portion of the data of the data transaction to the destination (block 745) and scanning and holding in the buffer a remaining portion of the data of the data transaction (block 750). If a virus is found during the scanning of the buffered data (block 750—VIRUS FOUND), process 700 may include dropping a connection for the data transaction (block 755). If a virus is not found during the scanning of the buffered data (block 750—NON-INFECTED), process 700 may include sending the remaining portion of the data of the data transaction to the destination (block 760).

For example, in an implementation described above in connection with FIG. 3, if scan processor 320 receives indicator 350 for a particular data transaction, scan processor 320 may send a portion of the data of the data transaction to a destination (e.g., client device 110 or server device 120), may store a remaining portion of the data of the data transaction in a buffer (e.g., memory 270) of network device 140, and may scan the remaining portion of the data. Scan processor 320 may provide results 370 of the fast path virus scanning process to result processor 330. If result processor 330 receives results 370, and results 370 indicate that the data of the data transaction provided in the buffer is infected with a virus, result processor 330 may generate result processing output 390 instructing network device 140 to drop a connection for the data transaction. If results 370 indicate that the data of the data transaction provided in the buffer is not infected with a virus, result processor 330 may generate result processing output 390 instructing network device 140 to send the remaining portion of the data of the data transaction to a destination (e.g., client device 110 or server device 120).

Systems and/or methods described herein may provide an antivirus intelligent flow framework for a network device, such as a router, a firewall, a switch, a gateway, etc.

The term component, as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7A and 7B, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set. No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a network device, a packet from a device in a network;
    identifying, by the network device, a plurality of data transactions associated with the packet;
    assessing, by the network device, a risk level associated with a particular data transaction of the plurality of data transactions;
    performing, by the network device, a content type check for the particular data transaction;
    performing, by the network device, an infected content check for the particular data transaction;
    classifying, by the network device, the particular data transaction for a fast path virus scanning process based on the risk level, the content type check, and the infected content check;
    sending, by the network device and after classifying the particular data transaction for the fast path virus scanning process, a first portion of data, associated with the particular data transaction, to a destination device before scanning the data for a virus;
    detecting, by the network device and after classifying the particular data transaction for the fast path virus scanning process, the virus in a second portion of the data; and
    terminating, by the network device and based on the particular data transaction being classified for the fast path virus scanning process, a connection for the particular data transaction after sending the first portion of the data and after detecting the virus in the second portion of the data.

2. The method of claim 1, further comprising:
    classifying another data transaction, of the plurality of data transactions, for a slow path virus scanning process;

storing, after classifying the other data transaction for the slow path virus scanning process, all data associated with the other data transaction in a buffer of the network device;

performing a scanning of the all data associated with the other data transaction;

sending a content replacement message for the other data transaction when the virus or a different virus is detected during the scanning; and sending, to a destination device, the all data associated with the particular data transaction when no viruses are detected during the scanning.

3. The method of claim 1, where detecting the virus in the second portion comprises:

storing, in a buffer of the network device, the second portion of the data; and scanning the second portion of the data to detect the virus after storing the second portion of the data in the buffer.

4. The method of claim 1, further comprising:

storing information associated with the virus in a virus data structure of the network device.

5. The method of claim 1, where assessing the risk level associated with the particular data transaction comprises:

determining a low risk rating for the risk level based on protocol layer information associated with the particular data transaction.

6. The method of claim 1, where performing the content type check for the particular data transaction comprises:

identifying a file type associated with the particular data transaction, and determining that the file type is associated with a low virus risk category.

7. The method of claim 1, where performing the infected content check for the particular data transaction comprises:

determining that some data of the particular data transaction does not resemble infected content identified in a virus data structure that includes information regarding previously found infected content.

8. A network device comprising:

a memory; and a processor to:

identify a data transaction, determine a risk level associated with the data transaction, perform a content type check for the data transaction, perform an infected content check for the data transaction, classify the data transaction for a fast path virus scanning process based on the risk level, the content type check, and the infected content check, send, after classifying the data transaction for the fast path virus scanning process, a first portion of data associated with the data transaction to a destination device without scanning the first portion of the data for a virus, detect, after classifying the data transaction for the fast path virus scanning process, the virus in a second portion of the data, and close a connection for the data transaction after sending the first portion of the data and based on detecting the virus in the second portion of the data.

9. The network device of claim 8, where the processor is further to:

classify a different data transaction for a slow path virus scanning process, store, in the memory, all data associated with the different data transaction, perform a scan, for viruses, of the all data associated with the different data transaction, send a content replacement message for the different data transaction when the virus or a different virus is detected during the scan, and send, to a destination device, the all data associated with the different data transaction when no viruses are detected during the scan.

10. The network device of claim 8, where, when detecting the virus in the second portion of the data, the processor is further to:

store, in the memory, the second portion of the data associated with the data transaction, and scan, for viruses, the second portion of the data to detect the virus after storing the second portion of the data.

11. The network device of claim 8, where the processor is further to:

store information associated with the virus in a virus data structure stored in the memory.

12. The network device of claim 8, where, when determining the risk level associated with the data transaction, the processor is further to:

determine the risk level based on protocol layer information associated with the data transaction.

13. The network device of claim 8, where, when performing the content type check for the data transaction, the processor is further to:

identify a file type associated with the data transaction, and determine whether the file type is associated with a low virus risk category.

14. The network device of claim 8, where, when performing the infected content check for the data transaction, the processor is further to:

determine whether some data of the data transaction resembles infected content identified in the memory.

15. A non-transitory computer-readable medium storing instructions, the instructions comprising:

one or more instructions that, when executed by one or more processors, cause the one or more processors to:

receive a packet associated with a plurality of data transactions;

assess a risk level associated with a particular data transaction of the plurality of data transactions;

perform a content type check for the particular data transaction;

perform an infected content check for the particular data transaction;

classify the particular data transaction for a fast path virus scanning process based on the risk level, the content type check, and the infected content check indicating that a risk of the particular data transaction containing a virus is less than a particular threshold;

send, after classifying the particular data transaction for the fast path virus scanning process, a first portion of data associated with the particular data transaction to a destination device without scanning the first portion of the data for the virus;

detect, after classifying the particular data transaction for the fast path virus scanning process, the virus in a second portion of the data; and terminate, based on the particular data transaction being classified for the fast path virus scanning process, a connection for the particular data transaction after detecting the virus in the second portion of the data.

16. The non-transitory computer-readable medium of claim 15, where the instructions further comprise:

one or more instructions that, when executed by the one or more processors, cause the one or more processors to:
  classify a different data transaction, of the plurality of data transactions, for a slow path virus scanning process;
  store, in a buffer, all data associated with the different data transaction after classifying the different data transaction for the slow path virus scanning process;
  perform a scan of the all data associated with the different data transaction;
  send a content replacement message for the different data transaction when the virus or a different virus is detected during the scan; and
  send, to a destination device, the all data associated with the different data transaction when no viruses are detected during the scan.

17. The non-transitory computer-readable medium of claim 15, where the one or more instructions to detect the virus in the second portion of the data comprise:
  one or more instructions that, when executed by the one or more processors, cause the one or more processors to:
    store, in a buffer of the network device, the particular portion of data associated with the particular data transaction; and
    scan of the second portion of the data to detect the virus after storing the second portion of the data.

18. The non-transitory computer-readable medium of claim 15, where the one or more instructions to perform the content type check for the particular data transaction comprise:
  one or more instructions that, when executed by the one or more processors, cause the one or more processors to:
    identify a file type associated with the particular data transaction; and
    determine whether the file type is associated with a low virus risk category.

19. The non-transitory computer-readable medium of claim 15, where the one or more instructions to perform the infected content check for the particular data transaction comprise:
  one or more instructions that, when executed by the one or more processors, cause the one or more processors to:
    determine whether some data of the different transaction resembles infected content based on a data structure that stores information regarding the infected content that was previously identified.

20. The method of claim 1, where classifying the particular data transaction includes:
  determining a risk that the particular data transaction contains the virus based on the risk level, the content type check, and the infected content check, and
  classifying the particular data transaction for the fast path virus scanning process based on the risk being less than a particular threshold.

21. The network device of claim 8, where, when classifying the data transaction, the processor is to:
  determine a degree of confidence that the data transaction is safe based on the risk level, the content type check, and the infected content check, and
  classify the data transaction for the fast path virus scanning process when the degree of confidence is greater than a particular confidence threshold.

* * * * *